United States Patent
Devic et al.

[11] Patent Number: 6,054,993
[45] Date of Patent: Apr. 25, 2000

[54] CHROMA-KEYED SPECULAR TEXTURE MAPPING IN A GRAPHICS PROCESSOR

[75] Inventors: Goran Devic, Austin; Christopher Shaw, Pflugerville, both of Tex.

[73] Assignee: Cirrus Logic, Inc., Fremont, Calif.

[21] Appl. No.: 08/932,402

[22] Filed: Sep. 17, 1997

[51] Int. Cl.[7] .................................................. G06T 7/40
[52] U.S. Cl. ...................... 345/426; 345/430; 345/431; 345/150
[58] Field of Search .................................. 345/430, 431, 345/150, 426

[56] References Cited

U.S. PATENT DOCUMENTS

| | | | |
|---|---|---|---|
| 4,583,185 | 4/1986 | Heartz | 364/521 |
| 4,586,038 | 4/1986 | Sims et al. | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,868,771 | 9/1989 | Lee et al. | 364/578 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 4,974,176 | 11/1990 | Buchner et al. | 364/522 |
| 5,097,427 | 3/1992 | Lathrop et al. | 345/430 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,230,039 | 7/1993 | Grossman et al. | 345/430 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,459,823 | 10/1995 | Silverbrook et al. | 345/431 |
| 5,710,876 | 1/1998 | Peercy et al. | 345/426 |

*Primary Examiner*—Mark R. Powell
*Assistant Examiner*—Motilewa Good-Johnson
*Attorney, Agent, or Firm*—Jonathan M. Harris; Conley, Rose & Tayon, P.C.

[57] ABSTRACT

A graphics system includes a graphics controller for rendering polygons with specular highlighting (glare) based on a comparison of texel color values from a texture map to a range of color values. The graphics processor includes range registers for storing the range of color values and color comparators for comparing a texel color value to the range of colors stored in the range registers. The range of color values used in the comparison corresponds to the range of colors of those portions of a texture for which specular highlighting is appropriate, such as metallic surfaces off which light reflects. If a texel color value to be applied to a screen pixel is within the range of colors defined for specular highlighting, the graphics processor adds an appropriate specular component to the texel value.

18 Claims, 8 Drawing Sheets

CHROMA-KEYED SPECULAR TEXTURE MAPPING IN A GRAPHICS PROCESSOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

A. Field of the Invention

The present invention relates generally to a graphics system for a personal computer. More particularly, the present invention relates to a method and apparatus for applying specular highlighting to pixels in a polygon. Still more particularly, the present invention relates to an improved method of applying specular highlighting to a polygon based on color values in a texture map.

B. Background of the Invention

Sophisticated graphics packages have been used for some time in expensive computer aided drafting, design and simulation systems. Increased capabilities of graphic controllers and display systems, combined with standardized graphics languages, have made complex graphics functions available in even the most routine applications. For example, word processors, spread sheets and desktop publishing packages now include relatively sophisticated graphics capabilities. Three-dimensional (3D) displays have become common in games, animation, and multimedia communication and drawing packages.

The availability of sophisticated graphics in PC's has driven a demand for even greater graphic capabilities. To obtain these capabilities, graphic systems must be capable of performing more sophisticated functions in less time to process greater amounts of graphical data required by modern software applications. In particular, there is a continuing need for improvements in software algorithms and hardware implementations to draw three-dimensional objects using full color, shading, texture mapping, and transparency blending.

The development of raster display systems has dramatically reduced the overall cost and increased the capabilities of graphic systems. In a raster display system, a set of orthogonal or horizontal scan lines, each comprising a row of pixels, forms an array or grid of pixels to represent the entire screen area. The screen preferably comprises a cathode ray tube (CRT), LCD display, or the like, capable of scanning the entire pixel grid at a relatively high rate to reduce flicker. The pixel data preferably is stored in a frame buffer comprising dynamic random access memories (DRAM's), or more preferably video RAMs (VRAM's), where each pixel is represented by one or more bits depending upon the desired resolution. In many graphics systems, for example, each pixel is drawn or "rendered" with 24 bits of color information (8 bits for red, 8 bits for green, 8 bits for blue). Typical display systems are capable of drawing screens with multiple colors at a variety of screen resolutions, including resolutions of 640 pixels ×480 pixels, 800×600, 1024×768, 1280 ×1024, or even higher pixel value combinations, depending upon the software drivers and the hardware used.

Typically, a video controller scans and converts the pixel data in the frame buffer to provide control signals for the screen system. In particular, the video controller renders the screen pixels, typically from the top of the screen to the bottom and from left to right, converting pixel data into color intensity values for each pixel. In a color graphics system using a CRT, three separate beams are controlled for each of the primary colors, where the intensity of each of the beams is determined by the pixel value corresponding to the respective colors. A similar system is used for LCD displays.

Other improvements have been made in the hardware realm. Graphics processors and accelerators are available with software drivers that interface the host central processing unit (CPU) to the graphics processor. In general, objects to be drawn on the screen are represented by one or more polygons. Each polygon is further represented by one or more triangles. The software driver receives information for drawing the triangles on the screen, calculates certain basic parameters associated with the triangles and provides these parameters to the graphics processor. The software driver then sends a command for the graphics processor to draw the triangle into the frame buffer. A graphics processor may use interpolation techniques in which the fundamental information for the triangle to be drawn comprises a set of initial and incremental parameters. The graphics processor loads or otherwise receives the initial parameters for rendering a first pixel, and then interpolates the remaining pixels in a triangle by using the incremented parameters until the triangle is complete.

Graphics processors, such as the GD5464 manufactured by Cirrus Logic, are capable of applying texture to polygons through a process referred to as texture mapping. Texture mapping techniques generally apply a bitmapped texture image to a polygon on the screen. A texture map typically is a two dimensional array of texture elements ("texels") that define a texture such as a brick, a carpet design, the grain of wood or any other texture that might be applied to an object on a computer screen.

In addition to texture, a graphics processor may apply glare, or specular highlight, to an object. In FIG. 1, for example, the front wall 20 of a jail cell includes numerous vertical bars 22 and one or more horizontal bars 24, as well as a door 21. Each bar typically is drawn to give the appearance of metal. To enhance the realism of the metallic surface of the bars 22, the bars are drawn to create the appearance of light reflecting off the bars by adding a specular component to the texel color values of the bars. Thus, many graphics processors create specular highlighting by adding white, or some other appropriate color, to the texel value to be applied to pixels on bars 22, 24. Further, the amount of specular highlighting can be varied by varying the intensity of the specular component applied to a particular texel value.

As noted above, objects drawn on the screen typically are represented by one or more triangles. Most, if not all, graphics systems apply specular highlighting on a triangle-by-triangle basis and to every pixel within a triangle. Such systems, therefore, must define triangles for those portions of a polygon to receive specular highlighting. Thus, because specular highlighting is to be applied only to the bars 22, 24, each bar must be represented with two or more triangles, as illustrated by triangles 32, 34 in FIG. 2. Moreover, as the number of surfaces increases for which specular highlighting is to be applied, the number of triangles to represent those surfaces necessarily also increases.

If not for the need to apply specular highlighting to bars 22, 24 in FIG. 1, jail cell wall 20 could be represented by relatively few triangles, such as by two triangles 25, 26 separated by dashed line 28. A texture map representing the wall including the bars 22, 24 and door 21 could then be applied to triangles 25, 26. Known specular highlighting techniques, however, apply specular highlighting to every pixel in jail cell wall 20, without distinguishing the dark regions 27 between the bars where no specular highlighting is appropriate. The need for specular highlighting thus requires the jail cell wall 20 to be divided into numerous triangles. A downside of conventional specular highlighting techniques is that objects often must be rendered with more triangles than otherwise would be required. An increase in the number of triangles required to render an object places a heavier demand on the system memory and processor.

A graphic processor uses a number of parameters to represent each triangle. As the number or triangles required for specular highlighting increases, so does the number of parameters required to represent the triangles. As a result, more memory is required to store the parameters representing the triangles. Further, a greater processing demand is placed on the graphics processor to render a larger number of triangles required by specular highlighting.

Accordingly, it would be desirable to provide a graphics system that renders objects on the display using as few triangles as possible. Such a system would place less of a performance demand on the graphics processor, while also providing high quality graphics. Such a graphics system would be free to perform other tasks that would otherwise have to wait or be slowed down by the system as it renders triangles just for sake of applying specular highlighting. To date, no system is known that solves this problem.

SUMMARY OF THE INVENTION

The problems outlined above are in large part solved by a graphics processor of the present invention. The graphics system includes a graphics controller for rendering polygons with specular highlighting (glare) based on a comparison of texel color values to a predefined range of color values. The predefined range of color values used in the comparison corresponds to the range of colors of those portions of a texture for which specular highlighting is appropriate, such as metallic surfaces off which light reflects. If the texel color value to be applied to a texel is within the range of color values, a specular component is added to the texel value before the texel value is used to render a pixel on a computer screen. Thus, the determination as to whether to add specular highlighting to a pixel is performed on a pixel-by-pixel basis. Moreover, objects can be represented and rendered with fewer triangles because no triangles are needed just for specular highlighting.

Preferably, the graphics processor includes multiple range registers for storing the range of color values and color comparators for comparing the texel color value to the range of colors stored in the range registers. Multiplexer logic coupled to the color comparators determines whether the texel color value is within the range of color values for which specular highlighting is appropriate. The multiplexer logic asserts a control signal dependent on whether the texel color value is within the range. The control signal is provided to a multiplexer which selects one of two input signals to be provided as an output signal. One input signal represents the texel color value and the other input signal represents the texel color value combined with a specular highlight component. The output signal from the multiplexer is used by the graphics processor to render a pixel.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF A PREFERRED EMBODIMENT

Figure 3:
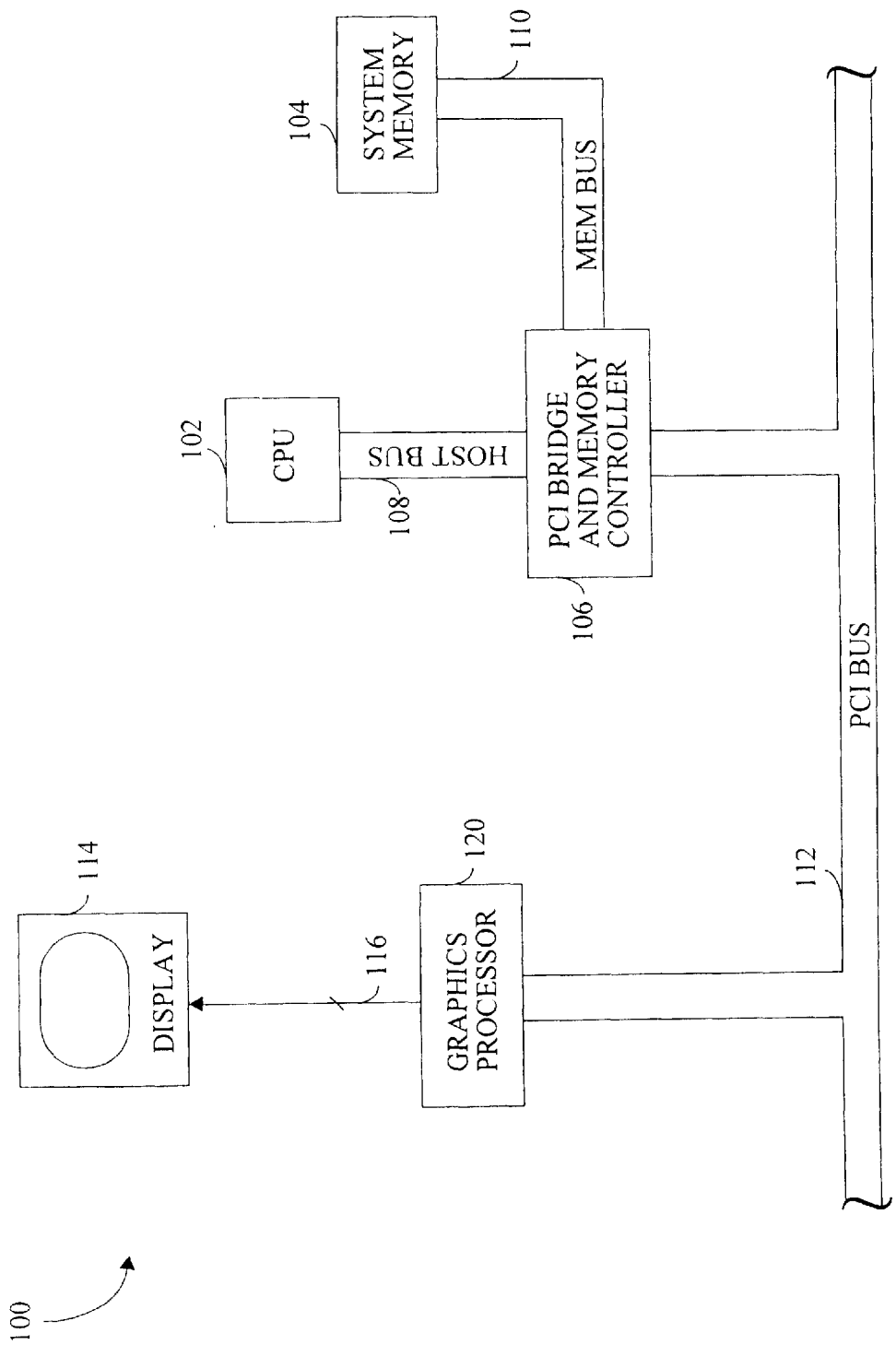
FIG. 3 shows a block diagram of the graphics system including a graphics processor in accordance with the preferred embodiment.

Referring now to FIG. 3, a computer system 100 constructed in accordance with the preferred embodiment generally includes CPU 102, system memory 104, a peripheral computer interconnect ("PCI") bridge and memory controller 106, a graphics processor 120, and a display 114. The CPU 102, system memory 104, PCI bridge 106 and display 114 preferably are known components. Thus, for example, the CPU 102 may include any available processor such as the Pentium MMX®, K6®, or any other processor capable of operating a computer system in a fashion consistent with the preferred embodiment. The system memory 104 preferably includes standard dynamic random access memory ("DRAM"), synchronous DRAM (SDRAM), or any other suitable type of memory. The PCI bridge and memory controller may include any suitable off-the-shelf device or may be a custom design. Display 114 includes standard cathode ray tube ("CRT") displays, flat panel displays, or any other display device capable of displaying graphics.

The CPU 102 connects to the PCI bridge and memory controller 106 via a host bus 108 which includes address, data, and control lines for transferring data. The PCI bridge and memory controller 106 also connects to system memory 104 via a memory bus 110 which also includes address, data, and control lines suitable for transferring data between system memory 104 and PCI bridge and memory controller 106. The CPU 102 may initiate read and write cycles to system memory 104 by way of host bus 108, PCI bridge and memory controller 106, and memory bus 110 according to known techniques.

A system bus 112, preferably comprising a PCI bus (although other bus architectures are also acceptable) connects the PCI bridge and memory controller 106 to graphics processor 120. It should be recognized by those of ordinary skill in the art that other devices besides those shown in FIG. 3 may also connect to the PCI bus 112. Examples of other devices include extended memory cards, video cards, and network cards. Graphics data in the form of a display list is transferred between CPU 102 and graphics processor 120 by way of host bus 108, PCI bridge and memory controller 106, and PCI bus 112. Once graphics data is received by the graphics processor 120 over the PCI bus 112, the graphics processor manipulates the data to provide appropriate signals over lines 116 to display 114 for displaying objects on the display.

Figure 4:
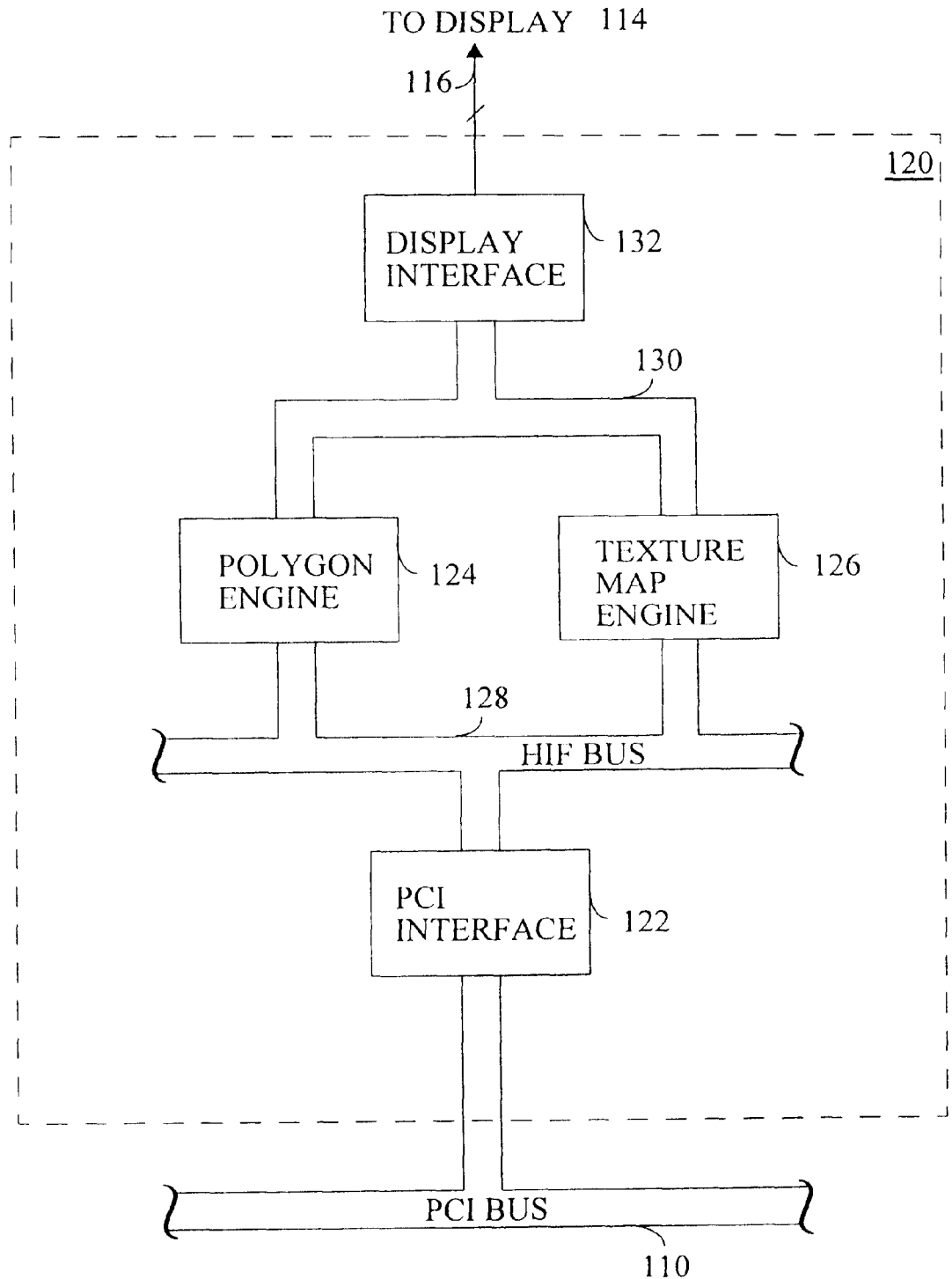
FIG. 4 is a block diagram of the graphics processor of FIG. 3 including a texture map engine in accordance with the preferred embodiment.

Referring now to FIG. 4, the graphics processor 120 of the preferred embodiment includes a PCI interface 122, a polygon engine 124, a texture map engine 126, and a display interface 132. The PCI interface 122, polygon engine 124, and texture map engine 126 couple together via bus 128 which preferably comprises a host interface (HEF) bus. The polygon engine 124 and the texture map engine 126 couple to the display interface 132 via bus 130. The display interface 132 uses the information provided to it from the polygon engine 124 and the texture map engine 126 to provide appropriate signals to display 114 over lines 116.

In accordance with the preferred embodiment, graphics processor 120 receives data in the form of a display list from the CPU 102 or system memory 104 via the PCI bus 112. The display list is stored in a register file in graphics processor 120 or memory (not shown) directly coupled to the graphics processor 120. The display list includes all information needed to draw a polygon. As explained in greater detail below, some of the values from the display list are used by the polygon engine 124 and some values are used by the texture map engine 126. It is assumed each polygon includes an upper or main triangle (such as triangle 47 in FIG. 1) abutting a lower or opposite triangle (such as triangle 49). The values in the display list include the data needed to render both upper and lower triangles. Table I below includes an exemplary display list identifying the values that are included in the list (first column of Table I) and the description of each value (second column). References to X and Y values refer to the x, y coordinates of pixels on the display (referred to as x, y pixel space). References to U and V values refer to the coordinates of texels in a texture map which are identified as u,v coordinates. The u, v coordinate system of a texture map is referred to as u, v texture map space. Further, references to SPEC values refer to specular highlighting and are used in accordance with a preferred embodiment of the invention described below.

TABLE I

Display List

| NAME | DESCRIPTION |
|---|---|
| X | Initial x pixel coordinate |
| Y | Initial y pixel coordinate |
| R | Initial Red value for initial x, y pixel |
| G | Initial Green value for initial x, y pixel |
| B | Initial Blue value for initial x, y pixel |
| ΔX MAIN | Main slope value: this value is added to the initial x coordinate on each step in y to generate the x starting point for each new ORTHO scan line. |
| Y COUNT | Top count: Bottom count concatenated. Determine the number of steps in y for the upper and lower portions of the triangle drawn. |
| X WIDTH MAIN | Initial upper width value. Width of the first ORTHO scan line in x of the upper (main) triangle |
| X WIDTH OPP | Initial bottom width value. Width of the first ORTHO scan line in x of the lower (opposite) triangle |
| ΔX WIDTH MAIN | Main width slope. This value is the amount by which the width of each scan line in x of the upper (main) triangle is adjusted on each step in y. |
| ΔX WIDTH OPP | Opposite width slope. This value is the amount by which the width of each scan line in x of the lower (opposite) triangle is adjusted on each step in y. |
| ΔR MAIN | Red main slope. This value is the amount by which the red color component start value for each scan line in x is adjusted on each step in y. |
| ΔG MAIN | Green main slope. This value is the amount by which the green color component start value for each scan line in x is adjusted on each step in y. |
| ΔB MAIN | Blue main slope. This value is the amount by which the blue color component start value for each scan line in x is adjusted on each step in y. |
| ΔR ORTHO | Red ORTHO slope. This value is the amount by which the red color component is adjusted for each step in x along a scan line. |
| ΔG ORTHO | Green ORTHO slope. This value is the amount by which the green color component is adjusted for each step in x along a scan line. |
| ΔB ORTHO | Blue ORTHO slope. This value is the amount by which the blue color component is adjusted for each step in x along a scan line. |
| Z | Initial z pixel coordinate. |
| ΔZ MAIN | Z main slope value. Added to z to generate starting z coordinate for each new scan line. |
| ΔZ ORTHO | Z ORTHO value. This value is the amount by which the z coordinate is adjusted along a scan line on each step in x. |
| V | Initial v coordinate of first texel address in texture map being used. |
| U | Initial u coordinate of first texel address in texture map being used. |
| ΔV MAIN | V main slope value. Amount by which the v texel coordinate start value is adjusted on each step in y. |
| ΔU MAIN | U main slope value. Amount by which the u texel coordinate start value is adjusted on each step in y. |
| ΔV ORTHO | V ORTHO slope value. Amount by which the v texel coordinate is adjusted on each step in x. |
| ΔU ORTHO | U ORTHO slope value. Amount by which the u texel coordinate is adjusted on each step in x. |
| R SPEC | Initial red specular value. |
| G SPEC | Initial green specular value. |
| B SPEC | Initial blue specular value. |
| ΔR SPEC MAIN | Red main delta value |
| ΔG SPEC MAIN | Green main delta value |
| ΔB SPEC MAIN | Blue main delta value |
| R SPEC ORTHO | Red Ortho delta value |
| G SPEC ORTHO | Green Ortho delta value |
| B SPEC ORTHO | Blue Ortho delta value |

It should be recognized that a display list may, and often will, include additional values such as second order u and v slope values used for providing perspective when applying a texture map to a polygon. Thus, the values in the display list of Table I are exemplary only and are not exhaustive of all the values included in a typical display list.

Figure 5:
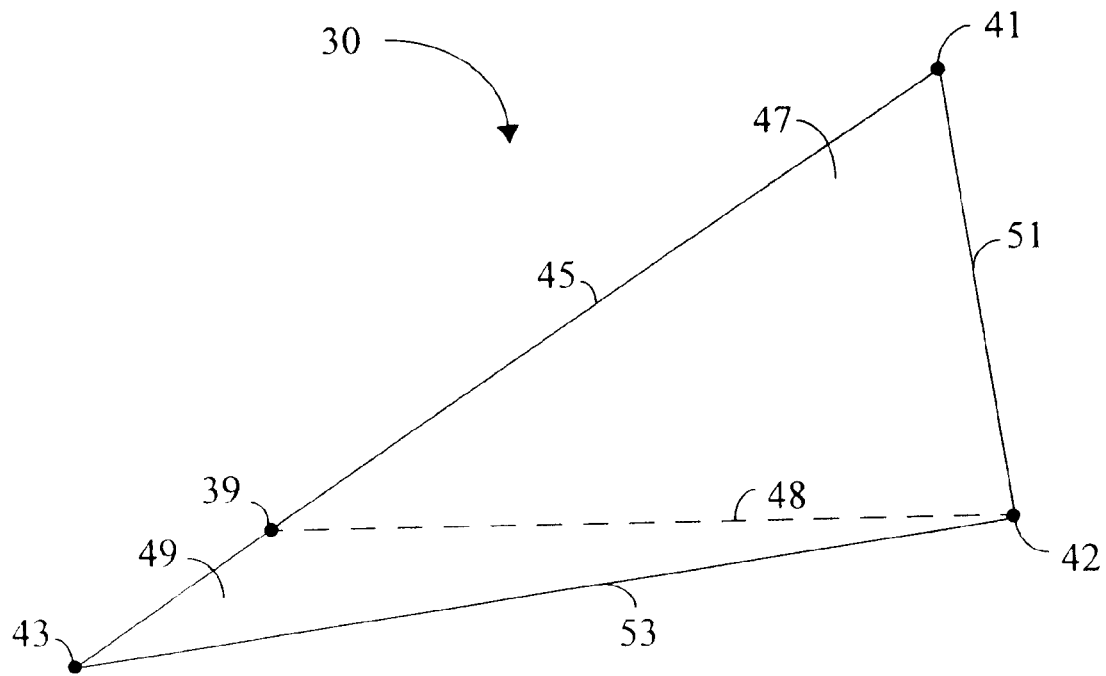
FIG. 5 shows an exemplary triangle used to represent objets by the graphics processor of FIG. 4.

The graphics processor 120 uses the values in the display list in Table I to draw a polygon and apply texture. The manner in which the graphics processor 120 renders a textured polygon will now be described with reference to FIG. 5 and Table I. A typical polygon 30 is shown in FIG. 5. The polygon 30 preferably is divided into two portions—an upper or main triangle 47 and a lower or opposite triangle 49 separated from main triangle 47 by horizontal dashed line 48. In general, however, a polygon is subdivided into as many triangles as are necessary to represent the polygon. For example, ten thousand triangles or more may be required to create a realistic looking image of a human face. Graphics objects typically are represented with a collection of triangles because triangles are simple geometric shapes that can be characterized with relatively few values as explained below.

Referring still to FIG. 5, polygon 30 may be drawn as two triangles, such as triangles 47, 49. To render triangles 47, 49, for example, a software driver receives vertex information (including x, y coordinates of each vertex 41, 42, 43) and identifies a main slope line 45 extending the vertical length (in the y direction) of polygon 30 between vertices 41 and 43. The other two sides 51, 53 of polygon 30 are referred to as opposite slopes. The polygon 30 is interpolated using orthogonal (ORTHO) horizontal scan lines of pixels that extend from the main slope 45 to the opposite edges 51, 53. The vertical or y parameter is used as a reference coordinate, so that the y pixel value preferably is incremented (or decremented depending on whether the triangle is rendered from top to bottom or bottom to top) by one for each scan line. A value for the main slope 45 is calculated as an initial condition and is used to compute the x coordinate of the first pixel in each can line (ie., the pixels on of the main slope). Initial and incremental width values are determined or the scan lines and the graphics processor intepolates the width rather than edge walking the opposite slopes. The interpolated width value is loaded into a counter and decremented for each pixel in the current scan line. When the width counter becomes zero or otherwise reaches terminal count, the counter asserts a terminal count signal indicating that the scan line is complete. Using such interpolation techniques, each triangle 47, 49 is drawn one row or horizontal scan line of pixels at a time. For each scan line, pixels are rendered from the main slope 45 to the opposite edges 51, 53.

For purposes of simplicity, the following discussion assumes the polygon 30 is drawn from top to bottom. Polygon 30 is drawn in a series of horizontal ORTHO scan lines in which each scan line includes one or more pixels. Because the ORTHO scan lines are horizontal, only the x coordinate changes from one pixel in the scan line to the next. Further, the polygon engine 124 preferably increments the x coordinate by one as the graphics processor renders each pixel in succession along an ORTHO scan line. To draw the upper or main triangle 47, the graphics processor needs to know or calculate the coordinate of the first pixel in the triangle (pixel 41, for example), the coordinate of the first pixel in each ORTHO scan line, the number of pixels in each scan line, and the number of scan lines in the triangle as described above. These values can be determined from the display list in Table I. The coordinate of the initial pixel is X, Y. The coordinate of the first pixel in each successive scan line is calculated by adding ΔX MAIN to X. It should be recognized that ΔX MAIN may be a positive or negative number depending on the slope of the line on which the first pixels in each ORTHO scan line lie. Thus, if the line on which the first pixels in each scan line lie slopes down and to the left (as is the case for the main slope line 45 in FIG. 5), then ΔX MAIN is a negative number because the x, y coordinate axes in the preferred embodiment have x coordinates increasing from left to right (y coordinates increase from the top of the display to the bottom). Thus, adding a negative value to an x coordinate produces an x coordinate to left on the display. Conversely, if the line on which the first pixels lie slopes down and to the right, ΔX MAIN will be a positive number. If the line is vertical, ΔX MAIN has a value of 0.

The number of pixels in each ORTHO scan line is calculated by adding ΔX WIDTH MAIN to the width (i.e., number of pixels in the x direction) of the previous scan line. The number of scan lines in a triangle is provided by the Y COUNT value which includes the number of scan lines in both the upper (main) triangle and lower (opposite) triangle. The portion of the Y COUNT value representing the number of scan lines in the main triangle preferably is loaded into a counter and decremented by one for each ORTHO scan line drawn. When the counter reaches its terminal count, the graphics processor has completed drawing the main triangle.

After the main triangle 47 of FIG. 5 is drawn, the opposite triangle 49 is then drawn using the same technique. The first pixel to be drawn preferably is pixel 39 and the width of the first scan line is the number of pixels along dashed line 48.

In accordance with the preferred embodiment, the texture map engine 126 applies a texture value (texels) to each pixel in the triangles drawn by polygon engine 124. The texels are stored in a texture map and are accessed using values in the display list in Table I above. It should be apparent that in x, y pixel space polygons are drawn by providing color values to each and every pixel in an ORTHO scan line, incrementing they coordinate to the next scan line and repeating the process.

Unlike polygon rendering in which only the x coordinate changes from one pixel to the next along an ORTHO scan line in x, y pixel space, both the u and v coordinate may change from one texel to the next along a single ORTHO scan line in texture space. The U and V values from Table I provide the coordinate of the first texel to be used from the texture map. The ΔU ORTHO and ΔV ORTHO values are used to calculate the u, v coordinate for each texel along an ORTHO scan line. The ΔU MAIN and ΔV MAIN values are used to compute the u, v coordinate for the first texel in a particular ORTHO scan line.

Figure 6:
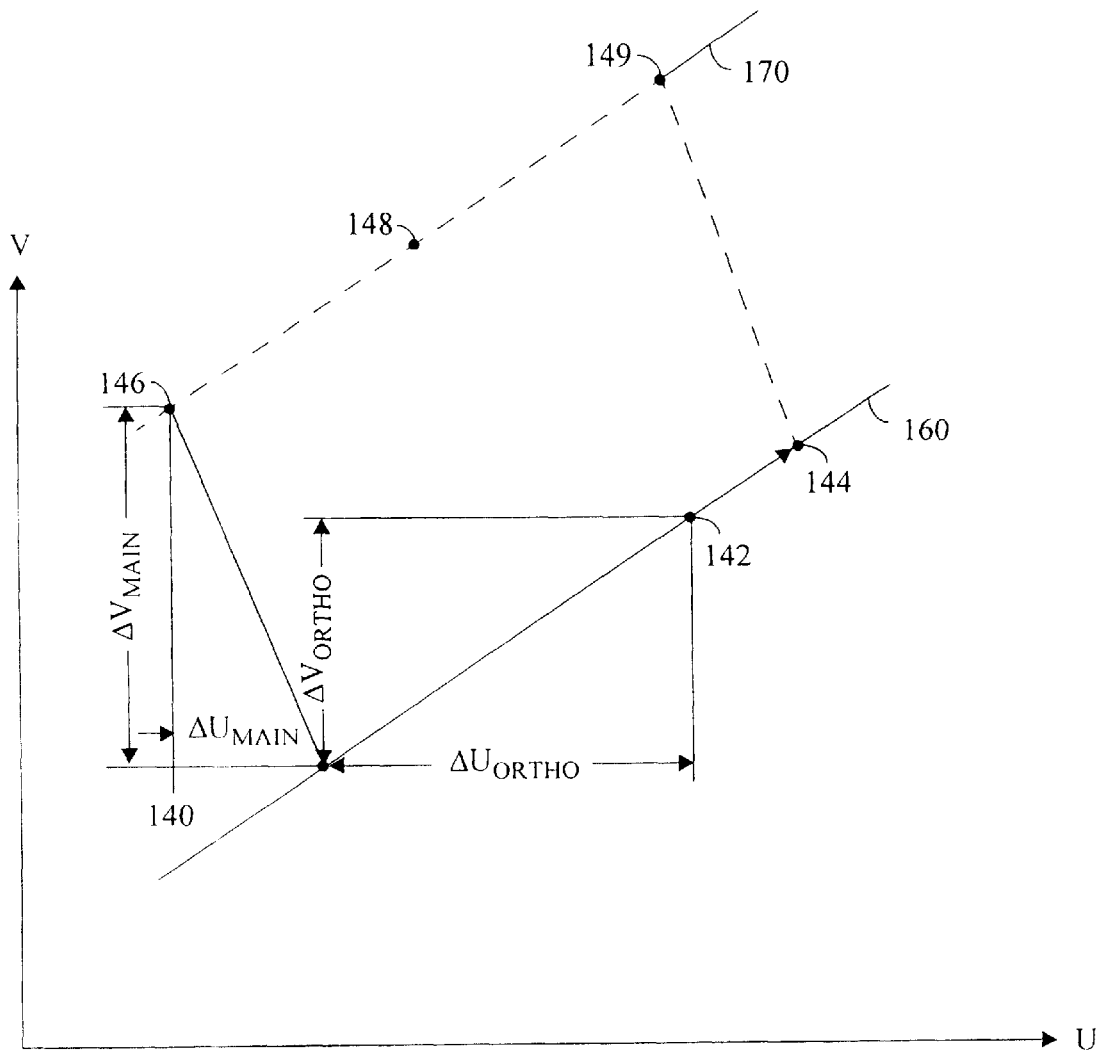
FIG. 6 depicts texture elements from a texture map used to render texture.

Referring now to FIG. 6, exemplary texels 140, 142, 144, 146, 148, 149 from a texture map are shown in relation to the u and v axes. Texels 140, 142, 144 are texels along ORTHO scan line 160 and texels 146, 148, 149 are texels along ORTHO scan line 170. Once texel 140 is determined by texture map engine 126, the u, v coordinate for texel 142 is calculated by adding the ΔU ORTHO and ΔV ORTHO values to the u, v coordinate of texel 140. The u, v coordinate of texel 144 is calculated in a similar fashion by adding the ΔU ORTHO and ΔV ORTHO values to the u, v coordinate of texel 142. Once the coordinates of all of the texels along ORTHO scan line 160 have been determined, the first texel (texel 146) on the next scan line (scan line 170) is determined by adding the ΔU MAIN and ΔV MAIN values to the u, v coordinate of texel 140. Thus, texture map engine 126 must retain the u, v coordinate of the first texel in a scan line until the first texel in the next scan line is calculated.

Figure 7:
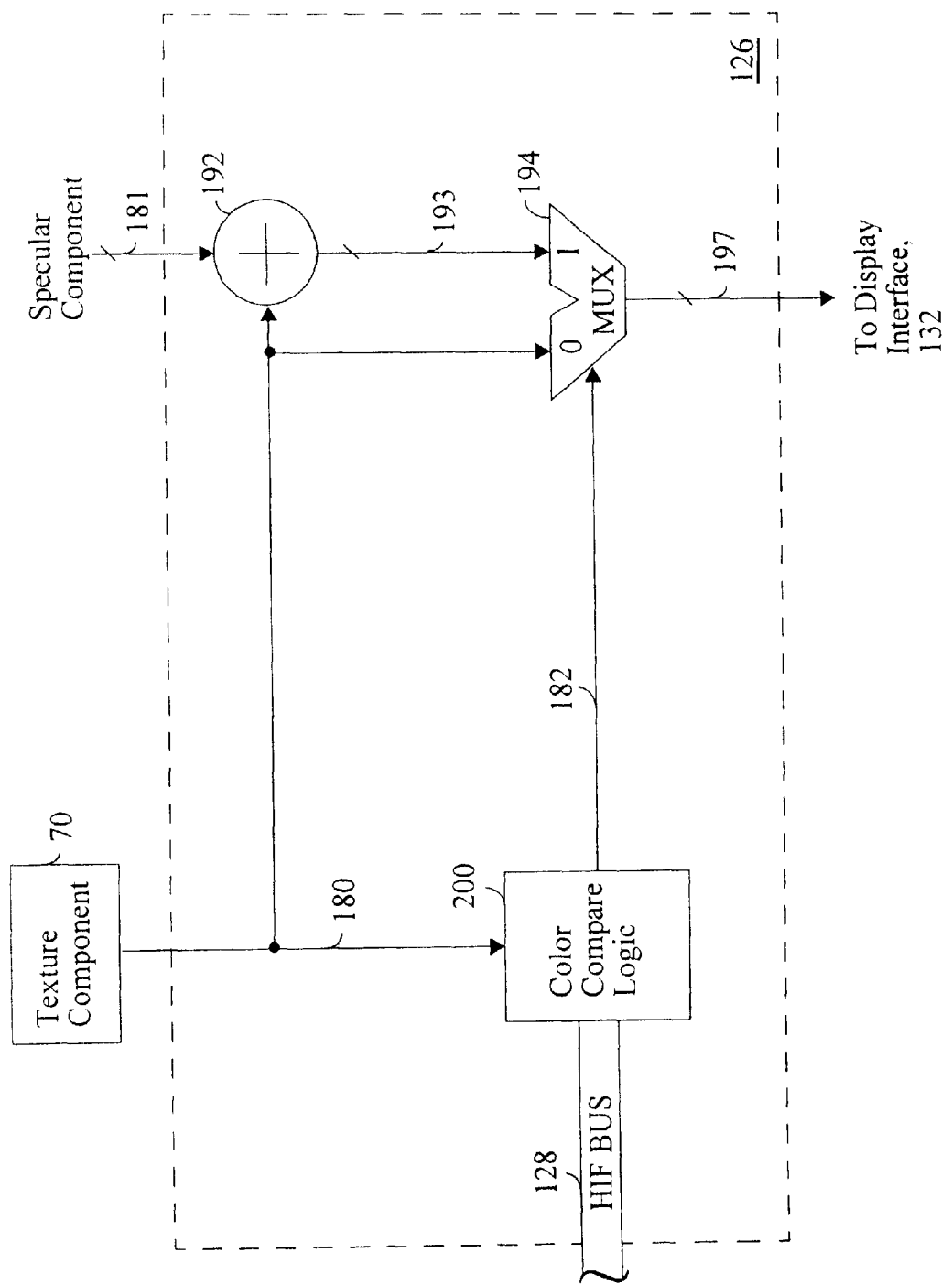
FIG. 7 shows a more detailed block diagram including color compare logic of the texture map engine of FIG. 4.

Referring now to FIG. 7, polygon engine 126 preferably includes color compare logic 200, summing logic 192, and multiplexer 194. It should be recognized that other components will be included in texture map engine 126, but are not shown for sake of clarity. Further, the logic components shown in FIG. 7 need not be included in texture map engine 126, but may be located elsewhere within graphics processor 120. A texel value on lines 180 from a texture map 70 is provided to color compare logic 200, in accordance with the preferred embodiment described above. Upper and lower color range values are provided via HIF bus 128 to color compare logic 200. The color compare logic 200 compares the texel value from texel map 70 to the color range values and determines whether the texel value is within the range defined by the color range values, as described in greater detail below. The range of color values is set to represent the range of values for which specular highlighting would be desired, such as the metallic color of the bars in FIG. 1.

Referring still to FIG. 7, the output of the color compare logic on line 182 comprises a control signal for multiplexer 194. The texel value from texel map 70 is provided to the "0" input of multiplexer 194. Summing logic 192 adds the texel value on lines 180 from texel map 70 to a specular component value on lines 181 preferably generated by the texture map engine. The output of summing logic 192, i.e, the texel color value combined with a specular component, is provided on lines 193 to the "1" input of multiplexer 194.

The output control signal on line 182 from the color compare logic 200 controls which of the two input signals to the multiplexer 194 is provided as an output signal from the multiplexer on lines 197. In accordance with the preferred embodiment, a high logic value for the control signal on line 182 selects the "1" input of multiplexer 194, thereby providing the specularized texture value from the summing logic 192 as the output signals on lines 197. A low logic value on control line 182 directs multiplexer 194 to select the "0" input (ie., the texel color value without a specular component) as the output signals on lines 197 from the multiplexer 194.

Color compare logic 200 thus determines whether to add a specular component value to a texel value from a texture map. This determination is made by comparing the texel value to a range of color values corresponding to colors for which specular highlighting is appropriate. The range of color values can be predetermined or programmed by the user or application software according to known techniques. Moreover, the graphics processor of the preferred embodiment determines whether to apply specular highlighting on a pixel-by-pixel basis.

Figure 8:
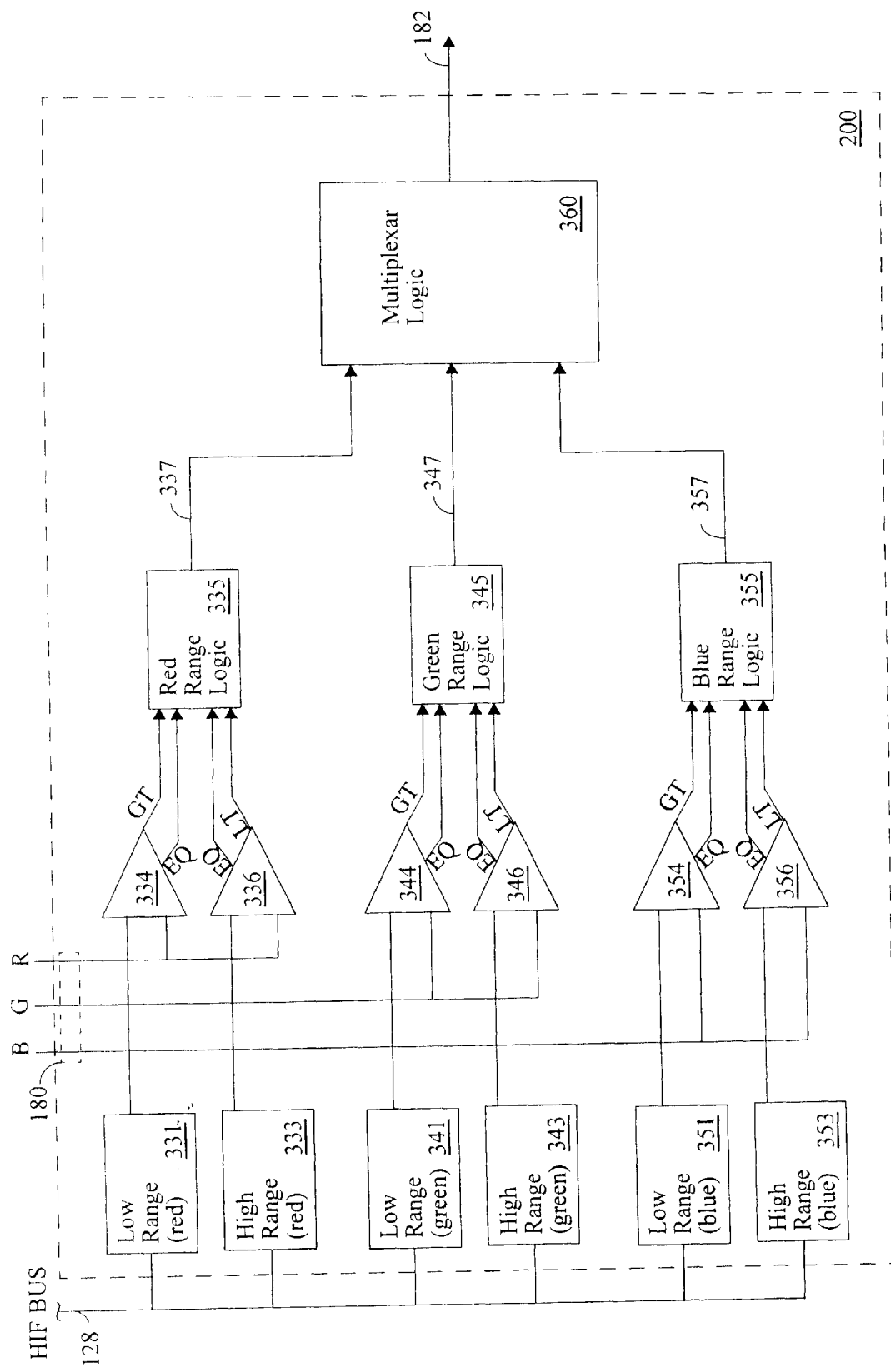
FIG. 8 shows a schematic of the color compare logic shown in FIG. 7.

Referring to now to FIG. 8, the color compare logic 200 preferably includes color range registers 331, 333, 341, 343, 351, and 353, color comparators 334, 336, 344, 346, 354, 356, color range logic 335, 345, 355, and multiplexer logic 360. Preferably using the HIF bus 128, the graphics processor 120 loads color range values into color range registers 331–353. Upper and lower limits which define the range for each of the three primary colors, blue, green, and red are loaded into range registers 331–353 by the graphics processor 120. Thus, graphics processor 120 loads a lower range value for red into a red low range register 331 and a high range value for red into a red high range register 333. Similarly the graphics processor 120 loads low range and a high range values for green into registers 341 and 343, respectively, and low range and high range color values for blue into range registers 351 and 353, respectively.

Referring still to FIG. 8, the color comparators 334–356 compare the color of the texel value on lines 180 with the low and high range values for each of the colors red, blue, and green. Color in a graphics system generally are represented by a combination of red, green and blue. Accordingly, each texel color value on lines 180 includes a red value, a green value and a blue value. In accordance with the preferred embodiments, color comparator 334 determines whether the red component of the texel value on lines 180 is greater than or equal to the low range color value for red stored in range register 331. The greater than (GT) output signal from color comparator 334 thus is asserted if the red component of the texel value on lines 180 is greater than the low range value for red stored in range register 331. If, however, the red component of the texel value is equal to the low range red value, then the equal to (EQ) output signal from color comparator 334 is asserted. Color comparator 336 determines whether the red component of the texel value is less than or equal to the high range red color value stored in range register 333. The less than (LT) output signal from comparator 336 is asserted if the red component of the texel value is greater than the high range red value of range register 333. If the red texel value is equal to the high range value in register 333, then the EQ output signal from comparator 336 is asserted. The four output signals from red comparators 334, 336 are provided to red range logic 335 which then determines whether the red texel value is within the range of colors defined by range registers 331 and 333. The output signal from red range logic 335 on line 337 is asserted if, in fact, the red texel value is within the range defined by range registers 331, 333.

Similarly, comparators 344 and 346, in conjunction with green range logic 345, determine whether the green texel value on lines 180 is within the range of green color values defined green range registers 341, 343. If the green texel value is within the range defined by range registers 341, 343, as determined by comparators 344, 346, the green range logic 345 asserts its output signal on line 347 so indicating. Blue color comparators 354 and 356 and blue range logic 355 determine whether the blue texel value is within the range of color values defined by low and high blue range registers 351, 353. Blue range logic 355 asserts an output signal on line 357 indicating whether the blue texel value on lines 180 is within the range of values defined by blue range registers 351, 353.

Multiplexer logic 360 receives the output signals on lines 337, 347, 357 from the red, green and blue range logic 335, 345, 355 and determines whether all three color components of the texel value on lines 180 are within their respective range limits defined by range registers 331–353. If the multiplexer logic 360 determines that all three color components of a texel value are within the range of colors defined by the range registers, it asserts the output control signal on line 182 which controls multiplexer 194 as described previously with respect to FIG. 7.

Figure 1:
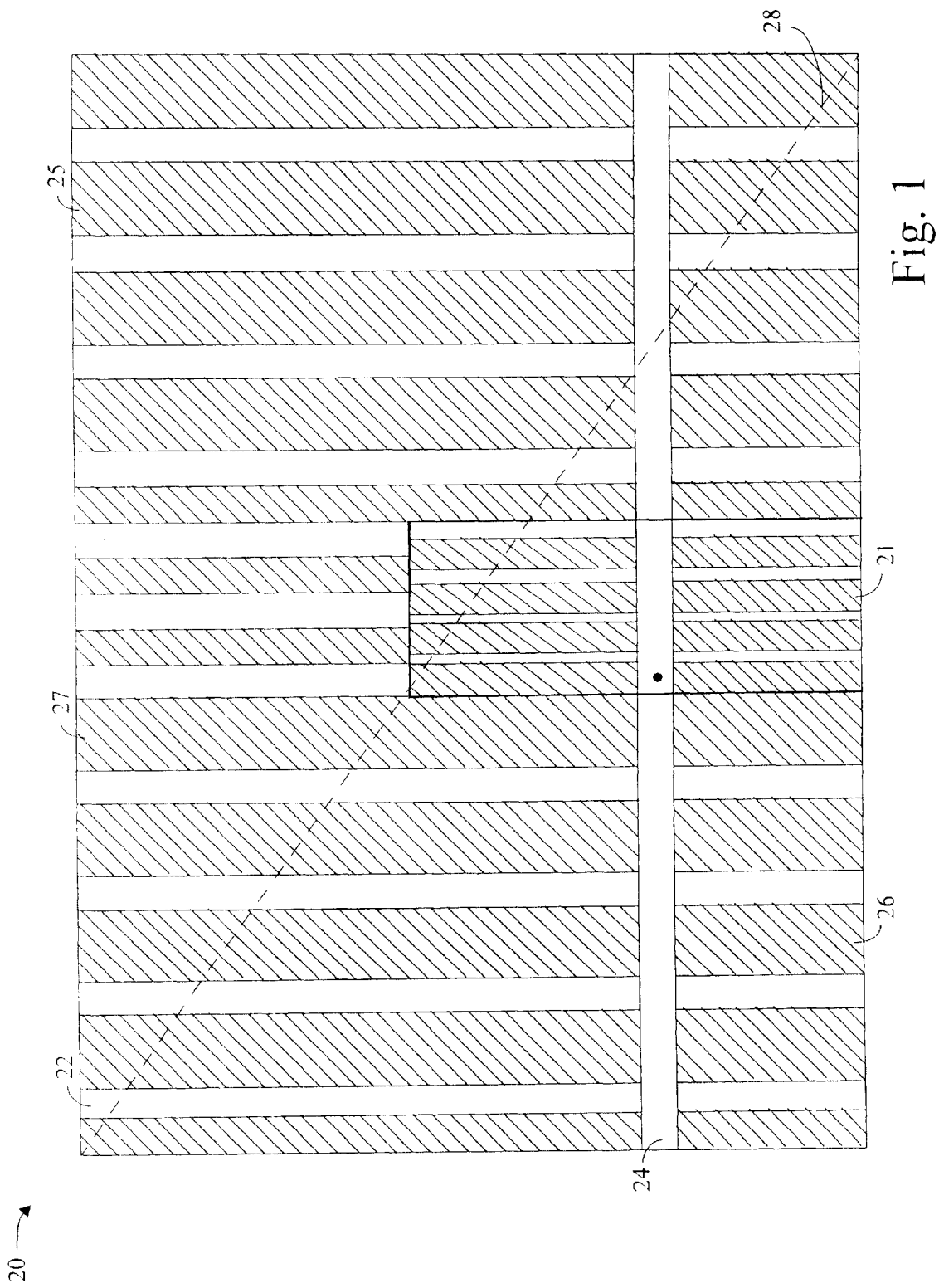
FIG. 1 shows an exemplary image of the jail cell wall including multiple metal bars.
Figure 2:
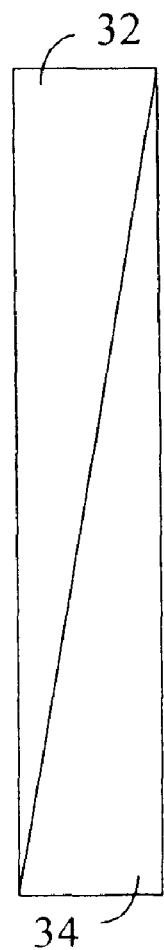
FIG. 2 shows a single metal bar of FIG. 1 represented by two triangles on which glare, or specular highlighting is applied.

As discussed above, the graphics processor 120, in accordance with the preferred embodiment, determines whether to apply a specular component to a texel color value by comparing the texel color value to a range of color values defined by range registers 331–353. The range of color values are predetermined to correspond to the surfaces in an object rendered on the screen for which specular highlighting is appropriate. Referring to FIG. 1, for example, metal bars 22, 24 and door 21 are represented by one or more texture maps, and preferably only one texture map. The range of colors defined by the color range registers preferably include the color values of the texels comprising the metal bars 22, 24 and door 21, and do not include the color values of the texels representing the spaces 27 between the bars. As such, specular highlighting is applied only on the bars 22, 24 and door 21 as is desired. Applying specular highlighting in accordance with the preferred embodiment of the invention allows objects, such as the jail cell wall 20 of FIG. 1, to be rendered with fewer triangles than previously possible because the invention does not require triangles to be defined for those portions of an object for which specular highlighting is desired.

Numerous variations and modifications will become apparent to those skilled in the art once the above disclosure is fully appreciated. It is intended that the following claims be interpreted to embrace all such variations and modifications.

What is claimed is:

1. A graphics processor that receives parameters defining a polygon from a host processor and which is capable of rendering said polygon with texture element (texel) color values, comprising:

a color compare logic;

a summing logic for adding a first input representing a specular component to a second input representing a texel color value to produce a summing logic output signal;

a multiplexer receiving an input representing said summing logic output signal and the second input;

said multiplexer controlled by said color compare logic;

wherein said color compare logic compares said texel color value with a range of color values, said range of color values corresponding to texel color values to which a specular component is to be added.

2. The graphics processor of claim 1 wherein said color compare logic asserts a control signal and said multiplexer selects one of its input signals to be an output signal based on the control signal from said color compare logic.

3. The graphics processor of claim 2 wherein said color compare logic asserts said control signal when said, texel color value is within said range of color values.

4. The graphics processor of claim 3 wherein said color compare logic includes:

a plurality of color range registers for storing said range of color values;

a plurality of color comparators coupled to said color range registers for comparing said texel color value to said range of color values;

a plurality of color range logic units coupled to said color comparators; and a multiplexer logic unit coupled to said color range logic units for asserting said control signal.

5. The graphics processor of claim 4 wherein said multiplexer logic unit asserts said control signal when said texel color value is within said range of color values.

6. A method for rendering an object on a computer screen, comprising:

representing the object with a plurality of triangles, each triangle comprising a plurality of pixels;

determining a texel color value to be applied to said pixels;

comparing said texel color value to a range of color values to determine whether to apply a specular component to said texel color value; and adding said specular component to said texel color value if said texel color value is within said range of color values.

7. The method of claim 6 further including storing said range of color values in a plurality of color range registers.

8. The method of claim 7 wherein said step of adding said specular component includes multiplexing said texel color value with said texel color value combined with said specular components.

9. The method of claim 8 wherein said multiplexing step includes multiplexing said texel color value combined with said specular components in response to a control signal.

10. The method of claim 9 wherein combining said texel color value with said specular component includes adding said texel color value to said specular component.

11. A computer system, comprising;

a host processor;

a peripheral bus bridge device coupled to said processor;

a peripheral bus coupled to said peripheral bus bridge device;

system memory coupled to said peripheral bus bridge device;

a graphic processor including:

a color compare logic;

a multiplexer controlled by said color compare logic; and a summing logic for adding a specular component to a texel color value to produce a summing logic output signal;

wherein said color compare logic compares said texel color value with a range of color values, said range of color values corresponding to texel color values to which a specular component is to be added; and a display coupled to said graphics processor.

12. The computer system of claim 11 wherein said multiplexer includes a first input and a second input, and said texel color value is provided to the first input and said summing logic output signal is provided to the second input.

13. The computer system of claim 12 wherein said color compare logic asserts a control signal and said multiplexer selects one of its input signals to be an output signal based on the control signal from said color compare logic.

14. The computer system of claim 13 wherein said color compare logic asserts said control signal when said texel color value is within said range of color values.

15. The computer system of claim 14 wherein said color compare logic includes:

a plurality of color range registers for storing said range of color values;

a plurality of color comparators coupled to said color range registers for comparing said texel color value to said range of color values;

a plurality of color range logic units coupled to said color comparators; and a multiplexer logic unit coupled to said color range logic units for asserting said control signal.

16. The computer system of claim 15 wherein said multiplexer logic unit asserts said control signal when said texel color value is within said range of color values.

17. A method for rendering an object on a computer screen, comprising:

representing the object with a plurality of triangles, each triangle comprising a plurality of pixels;

determining a texel color value to be applied to said pixels;

comparing said texel color value to a range of color values to determine whether to apply a specular component to said texel color value; by storing said range of color values in a plurality of color range registers; further by storing a high range value in a high range register and storing a low range value in low range register; then adding said specular component to said texel color value if said texel color value is within said range of color values.

18. The method of claim 17 wherein said high and low range values include a value for red, green and blue and said high and low range registers includes high and low range registers for red, green and blue.

* * * * *